(12) United States Patent
Bateman

(10) Patent No.: US 12,228,234 B2
(45) Date of Patent: Feb. 18, 2025

(54) INFLATABLE SLEEVE AND METHOD OF MANUFACTURING SAME

(71) Applicant: IBCO PTY LTD, Coromandel East (AU)

(72) Inventor: Ian Roger Bateman, Coromandel East (AU)

(73) Assignee: IBCO PTY LTD, Coromandel East (AU)

( * ) Notice: Subject to any disclaimer, the term of this patent is extended or adjusted under 35 U.S.C. 154(b) by 350 days.

(21) Appl. No.: 17/911,242

(22) PCT Filed: Mar. 12, 2021

(86) PCT No.: PCT/AU2021/050223
§ 371 (c)(1),
(2) Date: Sep. 13, 2022

(87) PCT Pub. No.: WO2021/179054
PCT Pub. Date: Sep. 16, 2021

(65) Prior Publication Data
US 2023/0094228 A1 Mar. 30, 2023

(30) Foreign Application Priority Data
Mar. 13, 2020 (AU) .................... 2020900773

(51) Int. Cl.
*F16L 55/165* (2006.01)
*B29C 53/36* (2006.01)
(Continued)

(52) U.S. Cl.
CPC .......... *F16L 55/1654* (2013.01); *B29C 53/36* (2013.01); *F16L 55/179* (2013.01);
(Continued)

(58) Field of Classification Search
CPC .... F16L 55/1654; F16L 55/179; B29C 53/36; B29K 2021/00; B29L 2023/001; E03F 2003/06
See application file for complete search history.

(56) References Cited

U.S. PATENT DOCUMENTS 6,732,763 B2  5/2004  Williamson et al.
2002/0189696 A1* 12/2002  Simpson ............... E21B 43/108
138/93

(Continued)

FOREIGN PATENT DOCUMENTS

AU  2003244547 B1  2/2004
CA     2696840 A1  4/2009
(Continued)

OTHER PUBLICATIONS

May 18, 2021 International Search Report issued in International Patent Application No. PCT/AU2021/050223.
(Continued)

*Primary Examiner* — David R Deal
(74) *Attorney, Agent, or Firm* — Williams Mullen; R. Brian Drozd

(57) ABSTRACT

An inflatable sleeve including one or more tubular portions including zones having different dimensions (e.g. thickness and/or diameter) and/or physical properties (e.g. elastic modulus) to enable control over the inflation characteristics of each zone, and a method of manufacturing same. The present invention further relates to a pipe junction sealing packer incorporating such an inflatable sleeve.

20 Claims, 12 Drawing Sheets

(51) Int. Cl.
  *B29L 23/00* (2006.01)
  *F16L 55/179* (2006.01)
  *B29K 21/00* (2006.01)
  *E03F 3/06* (2006.01)

(52) U.S. Cl.
  CPC ..... *B29K 2021/00* (2013.01); *B29L 2023/001* (2013.01); *E03F 2003/065* (2013.01)

(56) References Cited

U.S. PATENT DOCUMENTS

| | | | |
|---|---|---|---|
| 2003/0217777 A1* | 11/2003 | Williamson | ........ F16L 55/1656 138/125 |
| 2005/0092382 A1* | 5/2005 | Muhlin | ..................... E03F 3/06 138/97 |
| 2006/0130923 A1 | 6/2006 | Lepola et al. | |
| 2009/0126436 A1* | 5/2009 | Fly | ..................... F16L 55/1657 72/58 |
| 2012/0211114 A1 | 8/2012 | Nilsson et al. | |
| 2018/0031167 A1* | 2/2018 | Trapani | ............... F16L 55/1654 |
| 2019/0107241 A1* | 4/2019 | Kiest, Jr. | ................ E02D 29/128 |
| 2019/0137027 A1 | 5/2019 | Robinson et al. | |
| 2019/0323644 A1 | 10/2019 | Lokkinen | |
| 2020/0182391 A1* | 6/2020 | Kennard | ................ F16L 55/179 |

FOREIGN PATENT DOCUMENTS

| | | |
|---|---|---|
| DE | 102008063007 A1 | 7/2010 |
| KR | 101169040 B1 | 7/2012 |
| WO | 2001/077569 A2 | 10/2001 |

OTHER PUBLICATIONS

May 18, 2021 Written Opinion issued in International Patent Application No. PCT/AU2021/050223.

Jul. 15, 2022 International Preliminary Report on Patentability issued in International Patent Application No. PCT/AU2021/050223.

Jul. 24, 2023 Extended European Search Report issued in European Patent Application No. 21768979.3.

* cited by examiner

INFLATABLE SLEEVE AND METHOD OF MANUFACTURING SAME

FIELD OF THE INVENTION

The present invention relates to an inflatable sleeve including one or more tubular portions including zones having different dimensions (e.g. different thickness and/or diameter) and/or physical properties (e.g. different elastic modulus) to enable control over the inflation characteristics of each zone, and a method of manufacturing same. The present invention further relates to a pipe junction sealing packer incorporating such an inflatable sleeve.

BACKGROUND OF THE INVENTION

In domestic sewage collection systems, there is regularly a need to repair the lateral connection between house service pipes and the sewer main. In order to avoid digging into soil or breaking up concrete or the like, an installation apparatus (also referred to herein as a "sealing packer" or "packer" or "packer assembly") is typically pushed (or pulled) through a sewer main extending between human access chambers, and the lateral connection is sealed using an inflatable sleeve that positions a resin-impregnated liner material into the junction. The junction shapes are typically 90 degree tees or 45 degree wyes.

FIGS. 1-3 show an example of a prior art packer assembly 10 used to apply a textile liner 60 impregnated with resin to an internal connecting region 11 between a sewer main 12 and a house service line 13.

The assembly 10 includes a main body 14 and a lateral arm 15 which extends outwardly from the main body portion 14 intermediate its ends. The main body 14 has end ring flanges 16 located at both ends. The lateral arm 15 has at its distal end a guide means, typically in the form of a launcher 17, which acts as a guide for positioning of the lateral arm 15. The launcher 17 is pivotally attached to the lateral arm 15 through use of a flexible rod (not shown) which extends inside the main body 14 from one of the end ring flanges 16 to which it is fixed, through the lateral arm 15 to the launcher 17, which itself is pivotally connected to the free end of the flexible rod.

A lateral arm restrainer cable (not shown) is also connected between the launcher 17 and end ring flange 16 to prevent the launcher from becoming detached. Further, the launcher 17 has a pair of rollers 26 to assist in its movement. The free end 26 of the launcher 17 is resiliently moveable with respect to the main body 14 such that, in use within the main pipe 12, the wheels 26 press against the inside wall 12' of the main pipe 12 to provide a lead-in into the target branch pipe 13. The resilient movement of the wheels 26 with respect to the inside wall 12' is achieved through use of a spring (not shown) associated with steel plate 25 which is pivotally mounted to a ring flange 16', the steel plate 25 supporting the rollers 26. In other words, the spring (not shown) is arranged to pivotally pull the free end of the launcher 17 into contact with the inside wall of the main pipe 12.

A stiffening rod 30 is also shown in FIG. 1 and is adapted to be secured to the inside of the hose 19 to assist in rigidity. Also shown is a rod connector adaptor 31 secured to the end ring flanges 16 and used to connect push rods (not shown) to the packer assembly 10 to allow it to be manoeuvred into position and subsequently removed. Closed-Circuit TeleVision (CCTV) cameras (not shown) are used to assist in the movement of the assembly and an electric power lead 32 is used to power the cameras and light source required.

The packer 10 is pushed (or pulled) along the main pipe 12 until it reaches the target junction. As described above, the provision of a spring-biased launcher 17 at the distal end of lateral arm 15 provides an automatic lead-in into the target branch pipe 13 and thereby enables the operator to insert the liner 60 into position by pushing (or pulling) the packer assembly 10 through the main pipe 12 using the push rods (not shown). In particular, when at the junction, the packer 10 is positioned such that the distal end of the lateral arm 15 is located centrally in the junction opening. The packer 10 is then pushed (or pulled) a known distance and the lateral arm 15 moves up the junction to its "home position" (i.e. the position shown in FIG. 1).

An inflatable sleeve 18 forms the outer surface of the main body 14 and lateral arm 15, and is secured at its ends by bands 28. Air hose connectors 29 are located at both the ends of the end ring flanges 16 and are adapted to be used to input air from an air hose (not illustrated) into a cavity inside the sleeve 18 in the main body 14 and within the lateral arm 15. Once the packer assembly 10 has been moved into the correct position, the air supply can be input from either end as required. The packer assembly 10 is inflated and the resin-impregnated liner 60 is pressed against the interior 12' of the main 12, the interior 13' of the house service line 13, at the connecting region 11.

FIG. 2 shows the packer assembly 10 and liner 60, with the sleeve 18 associated with each of the main body 14 and lateral arm 15 inflated. While the inflatable sleeve 18 is expanded to the size of the main 12 and the house service line 13, the resin is allowed to cure. The sleeve 18 remains inflated until the resin is cured and then the packer 10 is deflated and dislodged from the liner 60, and removed from the main 12 as is shown in FIG. 3. Remaining in place is the cured (hardened) liner 60, hence the connecting region 11 between the main 12 and house service line 13 is repaired.

Traditionally, inflatable lateral packer sleeves are made from extruded tubes 62 of rubber that are vulcanised 64 together to form a Tee or Wye shape, as shown in the illustration right of the main perspective view of FIG. 1. In this way, the rubber sleeves have a constant diameter and thickness along their straight lengths, and each sleeve component is made of the same rubber compound.

When designing a lateral packer, such as packer 10 shown in FIGS. 1 to 3, there are several size trade-offs that need to be made.

On one hand, one might want the packer (and rubber sleeve) to be as large in diameter as possible. In this way, the rubber sleeve would not have to stretch very far to press the liner 60 against the walls of the pipes 12 and 13. In other words, it could operate at low pressures. It would also mean that the degree of stretch of the material, i.e. % elongation of the rubber, would be low. Accordingly, making the packer (and rubber sleeve) larger in diameter can simplify the rubber sleeve design, make the sleeves last longer and inevitably lower the cost. However, this also results in a packer having a large footprint and hence is likely to be more difficult to transport into and out of pipes 12 and 13.

There may be a preference for the packer to have as small a footprint as possible since this makes it easier to move the packer into and out of the pipe 12 and lateral 13. Since the packer 10 is typically equipped with other devices such as a CCTV camera for allowing the user to remotely view inside of the pipe during insertion and removal, the smaller the apparatus the better the vision. However, the smaller the packer, the smaller the rubber sleeves and hence the more that the rubber needs to stretch.

The Applicant has recognised a need for improving inflatable sleeves and the method by which packers and in particular the inflatable sleeves are manufactured to achieve an optimum or near optimum balance between the size of the packer (and sleeve) and the % elongation required to cause the sleeve to press the resin-impregnated liner material against the inside surface of the pipe(s) during inflation.

Another problem can arise during positioning of the packer and subsequent inflation of the sleeves. In this regard, it is very important for the packer assembly 10 to be lined up accurately prior to inflation such that the circumference of the lateral portion of the liner 60 is substantially concentric with the circumference of the lateral pipe 13. If the assembly is pushed (or pulled) too far, for example, even by ±1 centimetre (cm), there can be adverse consequences including wrinkling in the liner 60 through contact with the internal wall 13' of the branch pipe 13. As mentioned above, a CCTV camera is positioned such that it views the assembly from one or both ends thereof, and enables an operator to view the packer being positioned and subsequently inflated. The camera will generally be located at one end of the main section of the packer and provides the operator with a view of the packer and the liner material. The better the view the CCTV camera has, the better the view the operator has, hence positioning and inflating of the assembly can be improved by improving the view of the CCTV camera. The use of traditional inflatable sleeves and traditional methods of inflating the sleeves do not lend themselves to providing optimum camera views.

Inflating the sleeve 18 and hence the liner 60 is typically achieved in two steps, i.e. by first applying a gas pressure sufficient to inflate the central and branch portions of the liner 60 just to press against the internal wall of the main and branch pipes respectively, and then increasing the pressure to cause a final press against the wall to promote adhesion of the resin-impregnated liner. Ensuring this sequence of steps is currently difficult due to the main inflatable sleeve largely obstructing the view of the CCTV camera as a result of the initial inflation. The Applicant has recognised a need for an operator to retain vision of the liner material for as long as possible during inflation to enable the operator to see the liner material being pressed against the host pipe.

In addition to the abovementioned problems, when the sleeve 18 expands and then remains in a fully expanded state, there is an excessive amount of pressure placed on the clamping members (i.e. bands 28) holding the sleeve in place at each of its ends. Excessive inflation at these points can result in rubber failure and bursting.

It is an object of the present invention to overcome at least some of the aforementioned problems or to provide the public with a useful alternative.

SUMMARY OF THE INVENTION

In a first aspect, the present invention provides an inflatable sleeve for inflation inside a constrained vessel, the inflatable sleeve including a first zone that when inflated forms a first substantially tubular portion of the sleeve, and at least one further zone that when inflated forms at least one further substantially tubular portion of the sleeve, wherein the first and at least one further zone define an internal cavity of the sleeve into which gas pressure is introduced to inflate the sleeve, wherein the first and at least one further zone are made from the same blank of material, or from individual blanks of material, and each zone is shaped and then joined along or adjacent at least two edges thereof into a substantially tubular form, and wherein the first and at least one further zone are configured such that the first zone has a different dimension and/or physical property as compared with the at least one further zone, thereby causing the zones to inflate in a predetermined sequence and/or require a different gas pressure to reach an inner wall of the constrained vessel.

In an embodiment, said different dimension is achieved by causing the different zones to have a different thickness and/or diameter, and said different physical property is achieved by causing the different zones to be made of a different rubber compound, each rubber compound having a different elastic modulus (also known as modulus of elasticity).

In an embodiment, each blank of material is shaped into a substantially tubular form by being folded about a line of symmetry.

In an embodiment, the blank material is a rubber compound, or fibre reinforced rubber compound, capable of elongation in a radial direction relative to a longitudinal axis associated with each substantially tubular zone.

In an embodiment, when the first and at least one further zone are dimensioned such that the first zone has a greater thickness than the at least one further zone, and the first and at least one further zones are of substantially equal diameter, the at least one further zone will inflate first followed by the first zone when gas pressure is introduced inside said cavity.

In an embodiment, when the first and at least one further zone are dimensioned such that the first zone has a greater diameter than the at least one further zone, and the first and at least one further zones are of substantially equal thickness, the first zone will inflate first followed by the at least one further zone when gas pressure is introduced inside the cavity.

In an embodiment, when the first and at least one further zone have different physical properties in that each zone is made of a different rubber compound and hence has a different elastic modulus, wherein the greater the elastic modulus, the lesser the elongation at any given supply pressure.

In an embodiment, the sleeve includes at least one zone dimensioned such that when shaped and joined into a substantially tubular form, the resulting tubular portion is tapered and includes an increasing or decreasing lengthwise diameter.

In an embodiment, the vessel is a straight length of pipe, and joining two zones together includes joining an axial end of a first zone with an axial end of a second zone such that the two joined zones extend along a common axis.

In an embodiment, the vessel includes a main pipe and a lateral pipe, and joining two zones includes joining an end of the first tubular portion to an intermediate location along the second tubular portion such that the first tubular portion extends along a first axis inside the main pipe and the second tubular portion extends along a second axis inside the lateral pipe.

In an embodiment, the inflatable sleeve includes five zones that in use form a tubular sleeve having a main and a lateral tubular portion associated with each of the main pipe and lateral pipe respective.

In an embodiment, a first zone of the five zones forms a central part of the main tubular portion, a second zone forms a central part of the lateral tubular portion, a third and fourth zone are located at distal free ends of the main tubular portion, and a fifth zone is located at a distal free end of the lateral tubular portion.

In an embodiment, a thickness of the second zone is greater than a thickness of the first zone, and a thickness of the third, fourth and fifth zones is greater than the thickness of the first and second zones, and a diameter of the tubular portions formed by the first and second zones is substantially equal, said diameter being greater than a diameter of the tubular portions formed by each of the third, fourth and fifth zones, the sleeve thereby operable to cause the first zone to inflate prior to the second zone which will inflate prior to inflation of the third, fourth and fifth zones when gas is introduced inside the cavity.

In an embodiment, each of the third and fourth zones are dimensioned such that the resulting tubular portions are tapered and decrease in diameter as they extend away from the tubular portion formed by the first zone, and the fifth zone is dimensioned such that the resulting tubular portion is tapered and decreases in diameter as it extends away from the tubular portion formed by the second zone, the free ends of tubular portions formed by the third, fourth and fifth zones thereby dimensioned to facilitate clamping of the free ends.

In an embodiment the zones are joined using a vulcanisation process.

In a second aspect, the present invention provides one or more blanks of material for forming an inflatable sleeve configured in accordance with any one of the preceding statements.

In a third aspect, the present invention provides a method of manufacturing an inflatable sleeve configured in accordance with any one of the preceding statements, the method including shaping one or more blanks of material corresponding with each zone into substantially tubular form by folding each blank of material thereby causing at least two edges thereof to be drawn together, and joining the at least two edges to maintain the zone in said substantially tubular form.

In a fourth aspect, the present invention provides a method of manufacturing an inflatable sleeve configured in accordance with any one of the preceding statements, the method including shaping at least one blank of material to form the first zone, shaping at least one further blank of material to form the at least one further zone, joining at least two edges of the first zone to form a first tubular portion, joining at least two edges of the at least one further zone to form at least one further tubular portion, and joining the first and at least one further tubular portions to form said inflatable sleeve.

In a fifth aspect, the present invention provides a pipe liner installation apparatus for installing a flexible liner into an internal connecting region between a main pipe and a target branch pipe, the apparatus deployable from within the main pipe and including an elongate body, a lateral arm including a proximal end connected to the body and a distal end, an inflatable sleeve extending at least partially over the body and the lateral arm, the inflatable sleeve including a first zone that in use forms a first tubular portion of the sleeve extending at least partially over the body, and a second zone that in use forms a second tubular portion of the sleeve extending at least partially over the lateral arm, the first and second tubular portions defining a cavity into which gas pressure is introduced to inflate the sleeve, each zone made from the same blank of material, or from individual blanks of material, and each zone shaped and then joined along or adjacent at least two edges thereof into a substantially tubular form, and the first and second zones configured such that the first tubular portion has a different dimension and/or physical property as compared with the second tubular portion, thereby causing the zones to inflate in a predetermined sequence and/or require a different gas pressure to reach an inner wall of the constrained vessel.

In an embodiment, inflation of the sleeve causes the sleeve to press the flexible liner against inner walls of both the main pipe and the branch pipe until the liner is fixed in place.

In a sixth aspect, the present invention provides a method of installing a flexible liner into a junction between a main pipe and a branch pipe, the method including the steps of fitting the flexible liner over an installation apparatus, the apparatus including an elongate body, a lateral arm including a proximal end connected to the body, and a distal end, and an inflatable sleeve extending at least partially over the body and the lateral arm, the inflatable sleeve configured in accordance with one or more of the preceding statements, inserting the installation apparatus and fitted liner into the main pipe via an access opening, pushing or pulling the installation apparatus and fitted liner along the main pipe towards an entrance to the branch pipe, further pushing or pulling the installation apparatus and fitted liner along the main pipe so that the lateral arm is driven through the entrance of the branch pipe into the branch pipe, inflating the sleeve one or more times so as to press the fitted liner against the inner walls of both the main pipe and the branch pipe until the liner is fixed in place, deflating the sleeve, and withdrawing the installation apparatus from within the liner fixed within the branch and main pipes.

BRIEF DESCRIPTION OF THE DRAWINGS

Features of the present disclosure are illustrated by way of example and not limited in the following figure(s), in which like numerals indicate like elements, in which.

DETAILED DESCRIPTION OF EMBODIMENT(S) OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
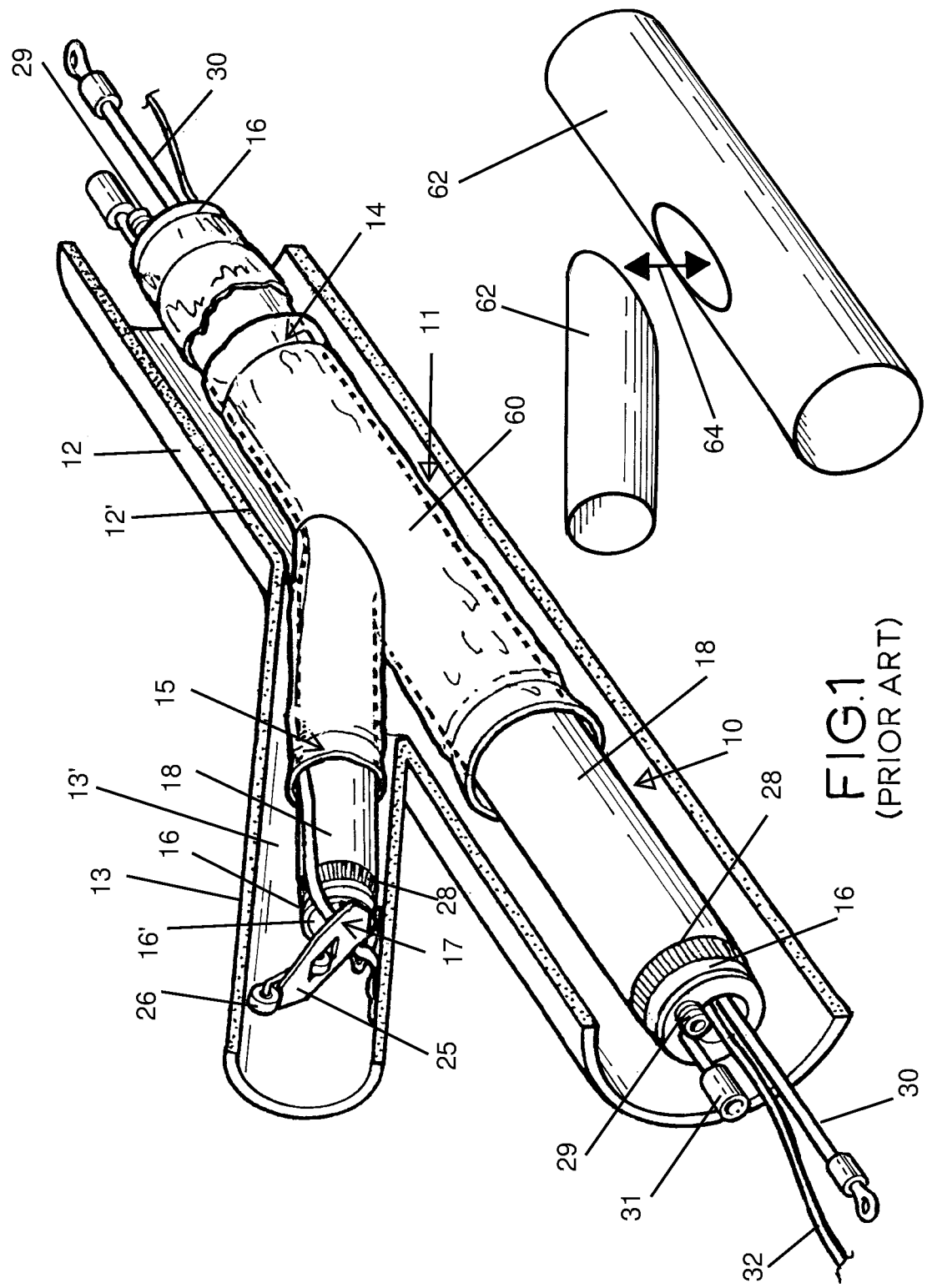
FIG. 1 illustrates a perspective view of a prior art packer assembly shown in position within a main pipe and a branch pipe, and a second perspective view of an inflatable sleeve portion used in the prior art packer assembly.
Figure 2:
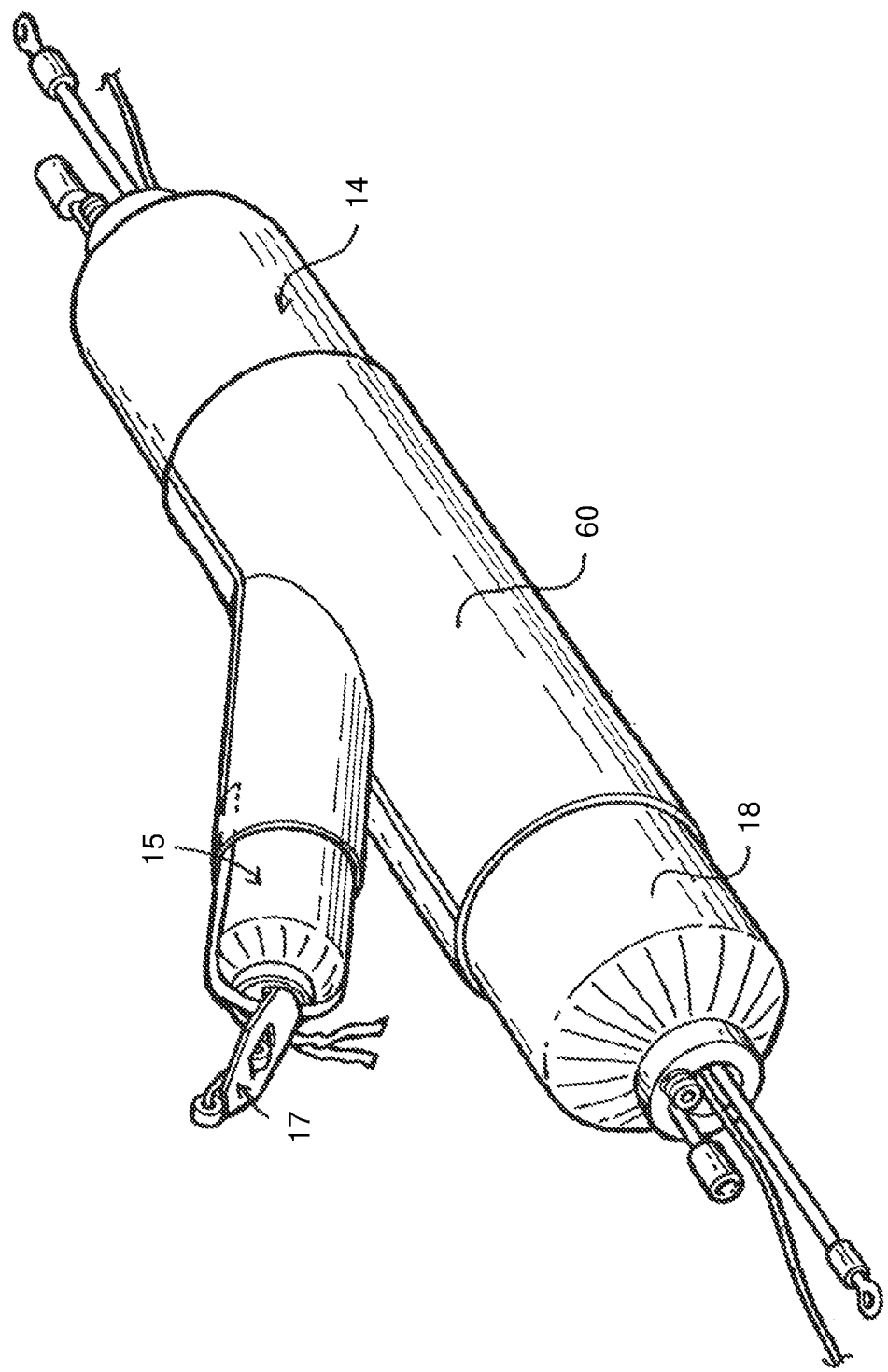
FIG. 2 illustrates a perspective view of the prior art packer assembly of FIG. 1 with the sleeve inflated.
Figure 3:
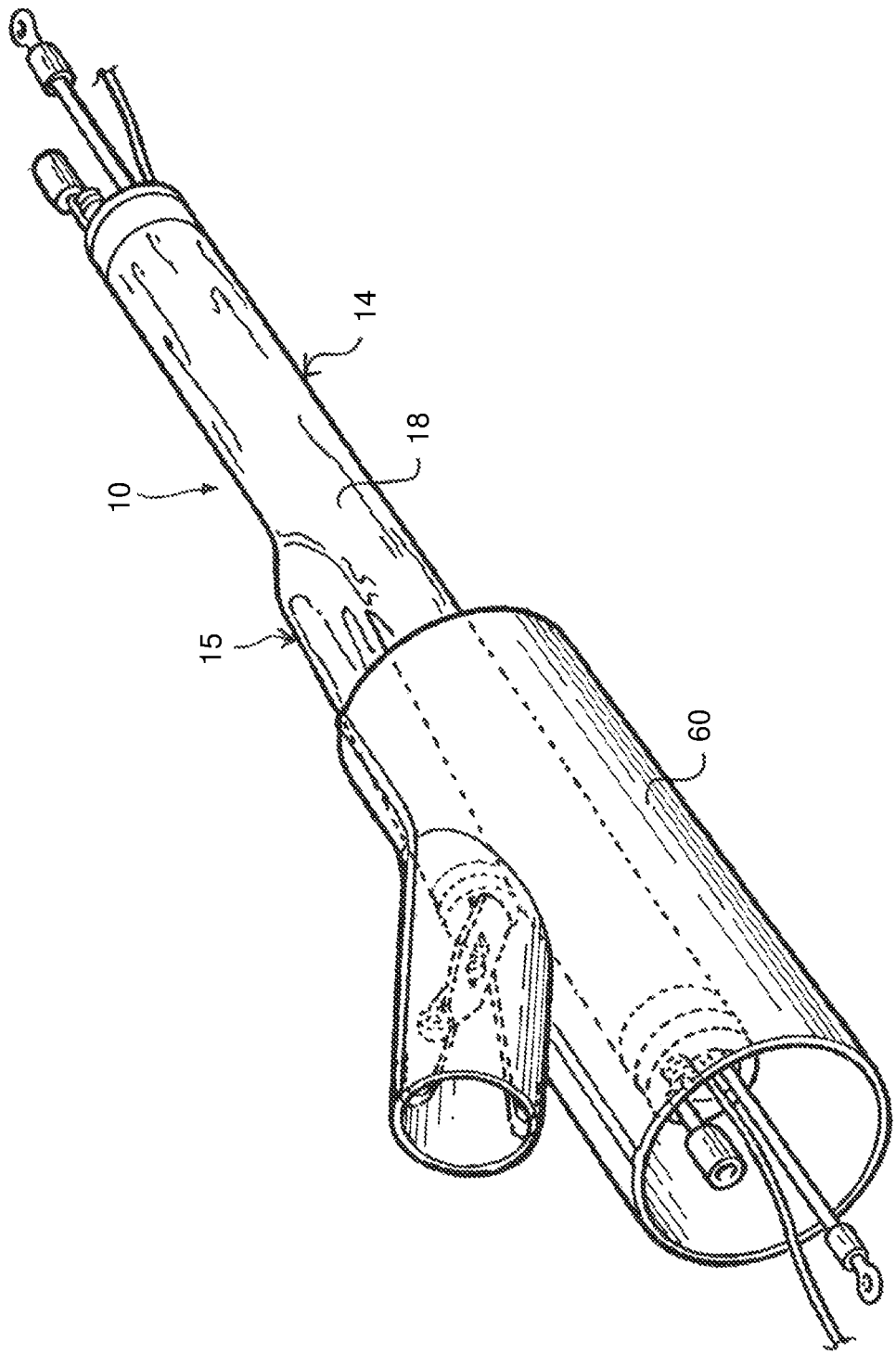
FIG. 3 illustrates a perspective view of the prior art packer assembly of FIG. 1 with the sleeve deflated and the assembly being extracted from the liner.

The present invention relates to improvements in inflatable sleeves for use in a pipe liner installation apparatus such as the sleeves used in the prior art packer assembly 10 shown in FIGS. 1-3. However, it is to be understood that the principle of the present invention could be applied to other applications in which a sleeve is required to be inflated in a controlled manner inside a constrained vessel.

In the pipe liner installation example, the inflatable sleeve sits over a skeleton (not shown) of the apparatus 10 shown in FIG. 1 and defines a cavity into which gas, e.g. air, is supplied for the purpose of inflating the sleeve and causing the flexible, resin-impregnated liner 60 to be installed into the internal connecting region 11 between the main pipe 12 and the lateral branch pipe 13, as previously described.

The inflatable sleeve (e.g. 100*a*, 100*b*, 100*c*, 100*d*) embodying the present invention may have a different dimension (e.g. thickness t and/or a different diameter D) and/or a different physical property (e.g. different elastic modulus associated with different rubber compounds) in specific locations to achieve one or more advantages, including but not limited to providing improved control over the inflation of the sleeve inside a constrained vessel 102, minimising overall pressures required for the inflation of the sleeve 100 whilst not significantly increasing its overall footprint, and minimising damage to the sleeve 100 and potentially other components by allowing certain parts of the sleeve 100 adjacent clamps and the like to only minimally inflate or not inflate at all.

Figure 4:
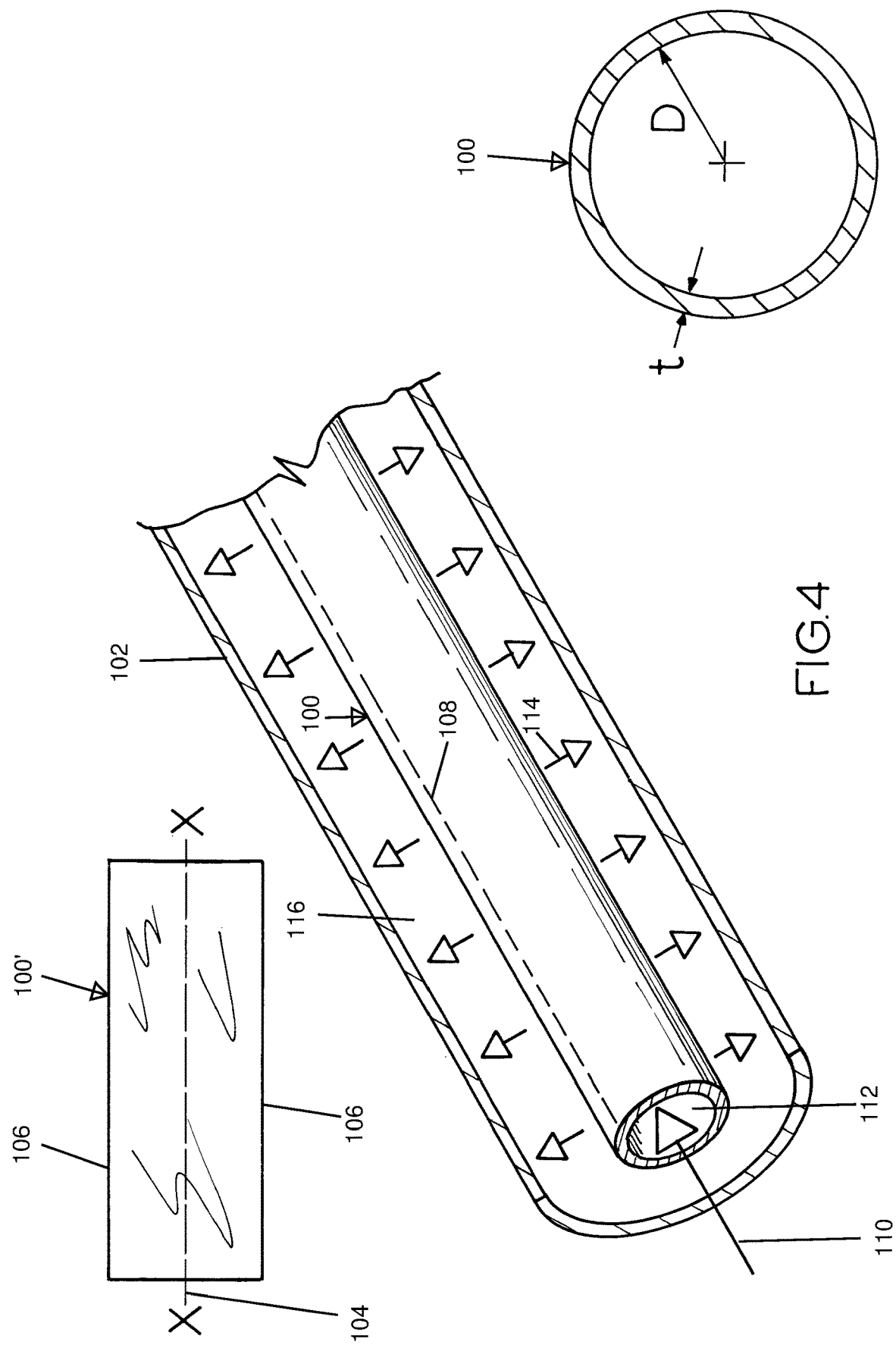
FIG. 4 illustrates a blank and an inflatable tubular portion formed therefrom located inside a constrained vessel.
Figure 5:
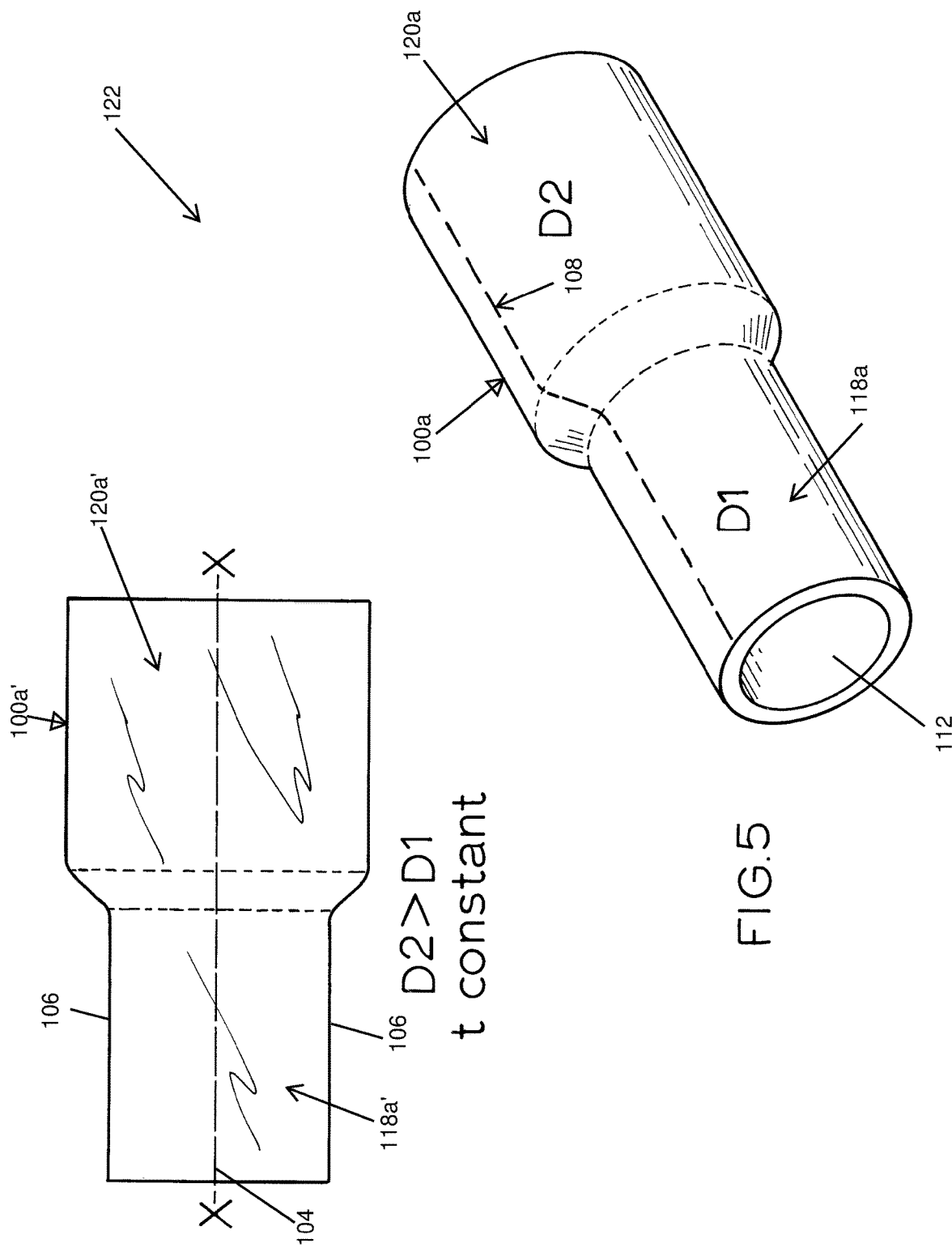
FIG. 5 illustrates a blank and an inflatable tubular portion formed therefrom, the blank and tubular portion including a first and second zone of different diameter according to an embodiment of the present invention.
Figure 6:
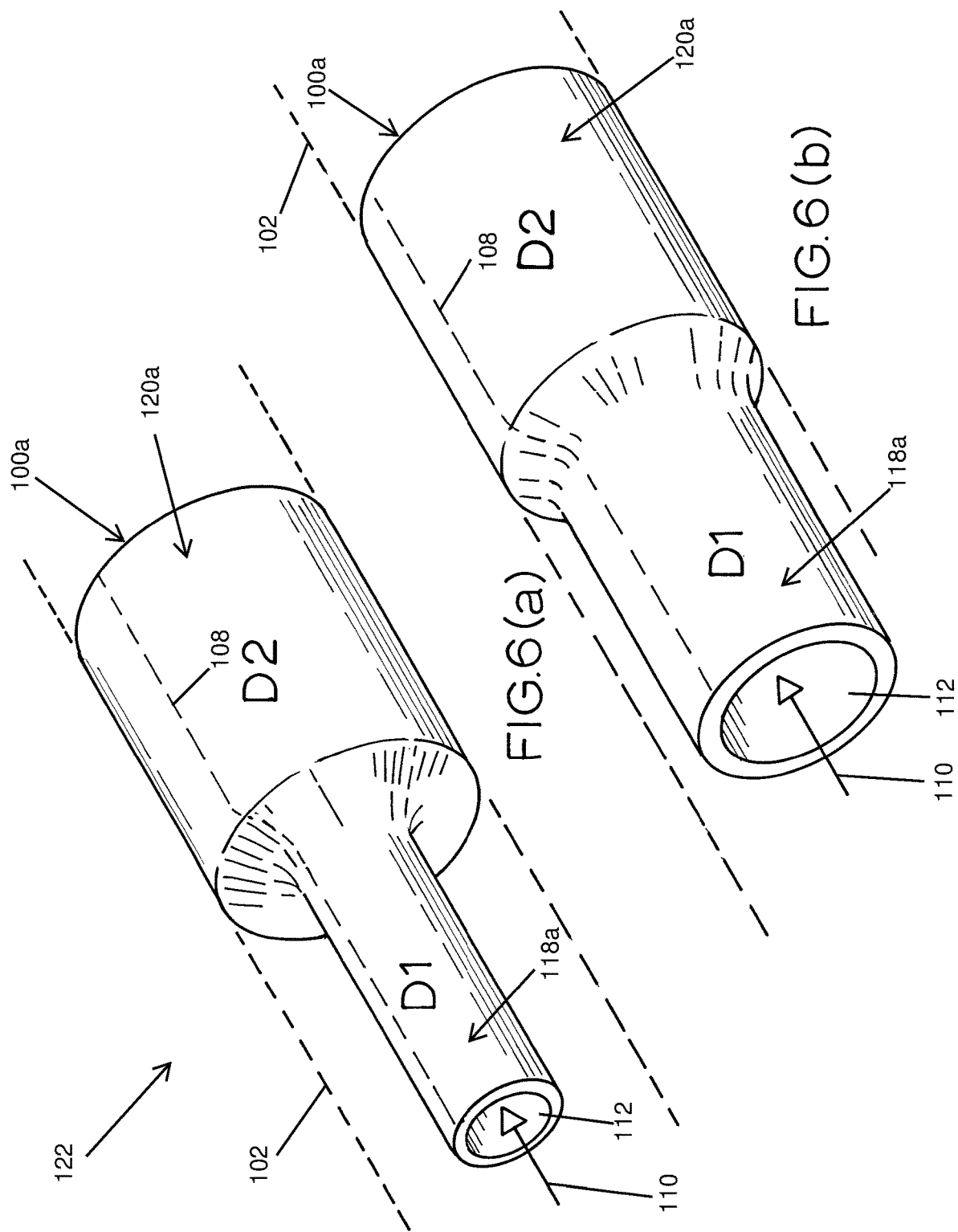
FIGS. 6a-6b illustrate in perspective view the sequential inflation of the tubular portion of FIG. 5.

An inflatable tubular sleeve 100 inside a constrained vessel 102 is shown in FIG. 4. It can be appreciated that the tubular sleeve 100 started as a flat sheet 100' (also referred to herein as a blank, or a blank of material) including at least two opposed edges 106, before being shaped (in this example folded along a line of symmetry 104) and joined along or adjacent the at least two edges 106, to form a tubular shape. Any suitable means of shaping and joining the blank of material may be utilised, for example, the blank may be shaped into a tube by wrapping same around a cylindrical structure such as a mandrel (not shown), and joined using a rubber vulcanisation process. The resulting join line 108 along the length of the sleeve 100 is also shown in FIG. 4.

The sleeve 100 in FIG. 4 is made entirely from of the same rubber compound and has a uniform thickness t and diameter D along its length, hence when gas 110 is introduced into a cavity 112 defined by the sleeve 100, the sleeve 100 inflates (or elongates) in a radial direction 114 (i.e. in an outward direction relative to the generally longitudinal axis of the sleeve 100) substantially uniformly along its length, and when sufficiently inflated will press against the internal wall 116 of the constrained vessel 102.

FIGS. 5-9 illustrate embodiments of the present invention in which a sleeve (100*a*, 100*b*, 100*c*, 100*d*) includes two or more zones (118, 120) of a different dimension (e.g. thickness and/or diameter) and/or physical property (e.g. elastic modulus), to afford control over the inflation of the sleeve. For example, a sleeve 100 may include a first zone 118 and a second zone 120, wherein the first and second zones are of a different thickness and/or diameter and/or rubber compound, which may affect the extent and/or sequence of inflation of the different zones.

In other words, the present invention provides an inflatable sleeve (100*a*, 100*b*, 100*c*, 100*d*) including at least a first zone (118*a'*, 118*b'*, 118*c'*, 118*d'*) that in use forms a first tubular portion (118*a*, 118*b*, 118*c*, 118*d*) of the sleeve, and at least one further zone (120*a'*, 120*b'*, 120*c'*, 120*d'*) that in use forms a further tubular zone (120*a*, 120*b*, 120*c*, 120*d*), wherein the first and second zones are configured such that the resulting first tubular portion (118*a*, 118*b*, 118*c*, 118*d*) has a different dimension (e.g. diameter D and/or different thickness t) and/or different physical property (e.g. elastic modulus based upon the rubber compound used) as compared with the second tubular portion (120*a*, 120*b*, 120*c*, 120*d*). This enables the first and second tubular portions to inflate in a controlled manner (e.g. predetermined sequence) inside a constrained vessel 102 when gas 110 is introduced inside the sleeve cavity 112.

In one example (not shown), the two zones could have the same thickness t and the same diameter D, but be made of different rubber compounds and hence have a different elastic modulus. For example, one zone may be made of rubber compound having an elastic modulus which causes it to elongate to a lesser extent at any given supply pressure as compared with the rubber compound used in the other zone, hence the sequence of inflation can also be controlled by altering the material (e.g. rubber compound) used in each zone.

There are benefits that arise from different zones having different physical properties (e.g. the use of hard rubber in one zone compared with soft rubber in another, or where one zone includes fibre-reinforced rubber and the other zone is not fibre-reinforced). In an example, a packer that is configured for use in a 300 mm main and 100 mm lateral pipe includes a sleeve having a main and a lateral zone made of the same rubber compound. By using 12 mm thick rubber in the 300 mm zone, and 6 mm rubber in the 100 mm lateral zone, each zone will reach the internal wall of the respective host pipe at the same time (based upon introduction of gas pressure of approximately 80 kPa). However, 12 mm thick rubber in the 300 mm zone is substantial and heavy, and by adjusting the physical properties of that zone, it is possible for rubber of a reduced thickness to be used. For example, if that zone is changed to a harder rubber compound, the thickness can be reduced to 6 mm whilst the softer rubber in the lateral is maintained at 6 mm thickness (such that there is now consistent thickness across both zones), and both will still reach the internal wall at the same time. Using different physical properties across different zones is particularly useful when dealing with pipes of larger diameter that would otherwise require proportionately larger zone thicknesses to ensure that the zones reach the internal wall of the host pipe at the same time.

Fibre-reinforced rubbers are rubber compounds which incorporate fibres that enable control over directional behaviour of a particular zone. As compared with a rubber compound that does not include fibre reinforcement that stretches (elongates) in three dimensions, a fibre-reinforced rubber compound may elongate in one or more directions to the exclusion of one or more other directions. For example, if the fibre is disposed lengthways in a particular zone, then the zone will not extend lengthways. Similarly, if the fibre is disposed circumferentially, then the zone will not elongate circumferentially during inflation. One skilled in the art will appreciate that by controlling the disposition of the fibre, one may control the extent to which a particular zone elongates in one or more directions. In one example, where a 9 mm thick zone is to include a fibre reinforcement, the zone may be built up using three overlapping 3 mm layers of rubber compound, wherein the fibre layer is sandwiched between two of the layers.

There are also benefits associated with different zones having different dimensions. In the example 122 shown in FIG. 5, the first 118a' and second 120a' zones of blank 100a' are dimensioned such that the resulting second tubular portion 120a has a greater diameter D2 than diameter D1 associated with the resulting first tubular portion 118a. In this embodiment, the first 118a' and second 120a' zones are made of the same or similar rubber compound and are of substantially equal thickness t. As shown in FIG. 6(a), as a result of varying the diameter of the two zones, the second tubular portion 120a will inflate first until it presses against the internal wall 116 of the vessel 102, followed by the first tubular portion 118a as shown in FIG. 6(b).

Figure 7:
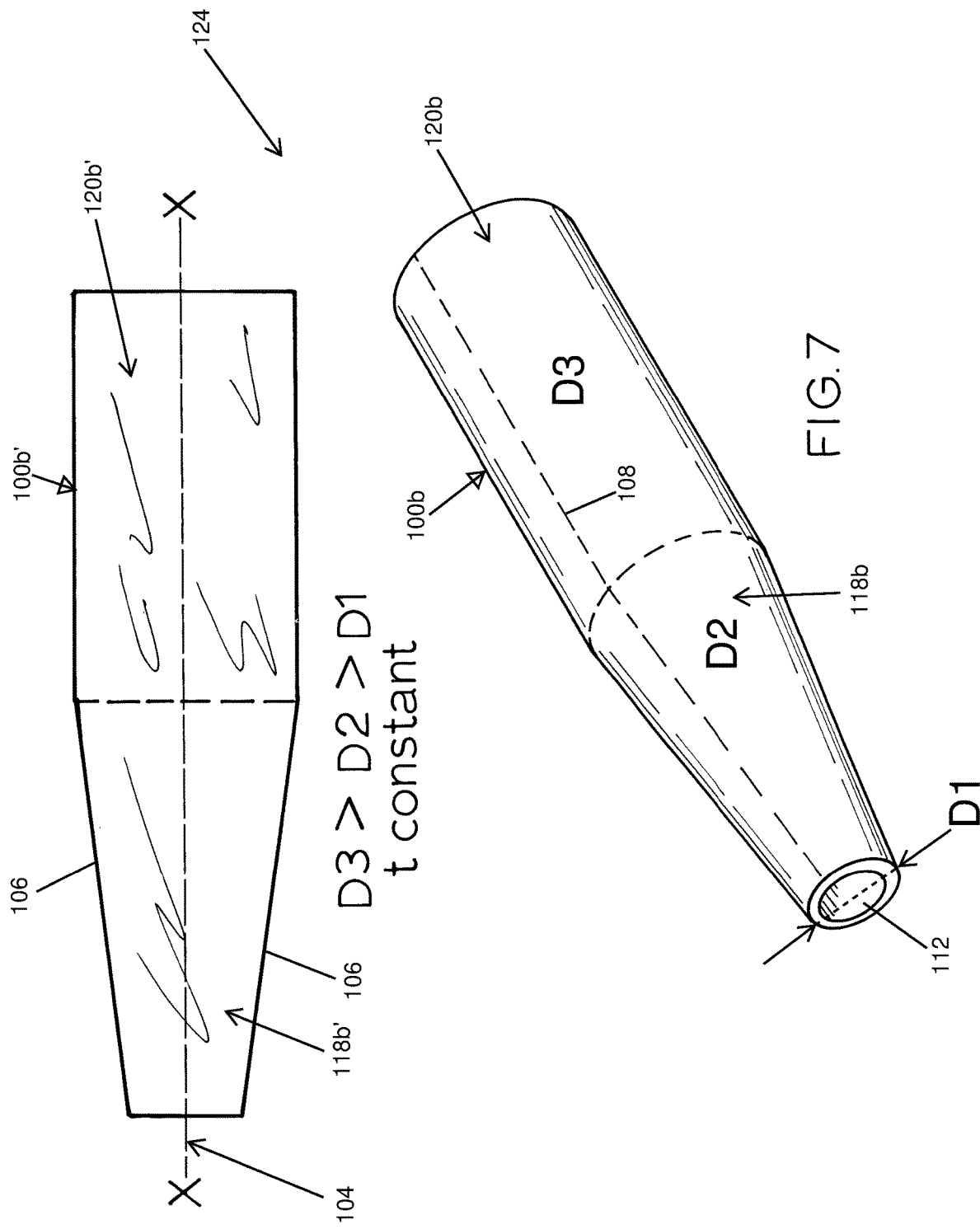
FIG. 7 illustrates a blank and an inflatable tubular portion formed therefrom, the blank and tubular portion including a first and second zone wherein the second zone decreases in lengthwise diameter according to an embodiment of the present invention.

There may be applications that require a sleeve zone to have a tapered body such that the sleeve includes an increasing or decreasing lengthwise diameter. FIG. 7 shows an example 124 of a sleeve 100b configured in this way, wherein a first 118b' and second 120b' zone of blank 100b' are dimensioned such that the resulting second tubular portion 120b has a greater diameter D3 than diameter D2 associated with the first tubular portion 118b. The diameter D2 of the resulting first tubular portion 118b decreases in a lengthwise direction when moving away from the resulting second tubular portion 120b such that the distal free end of first tubular portion 118b has the smallest diameter D1. It can be appreciated that this configuration is a result of the edges 106 associated with the first zone 118b' being tapered, whilst the thickness t and the rubber compound used in the respective zones remain constant.

Figure 8:
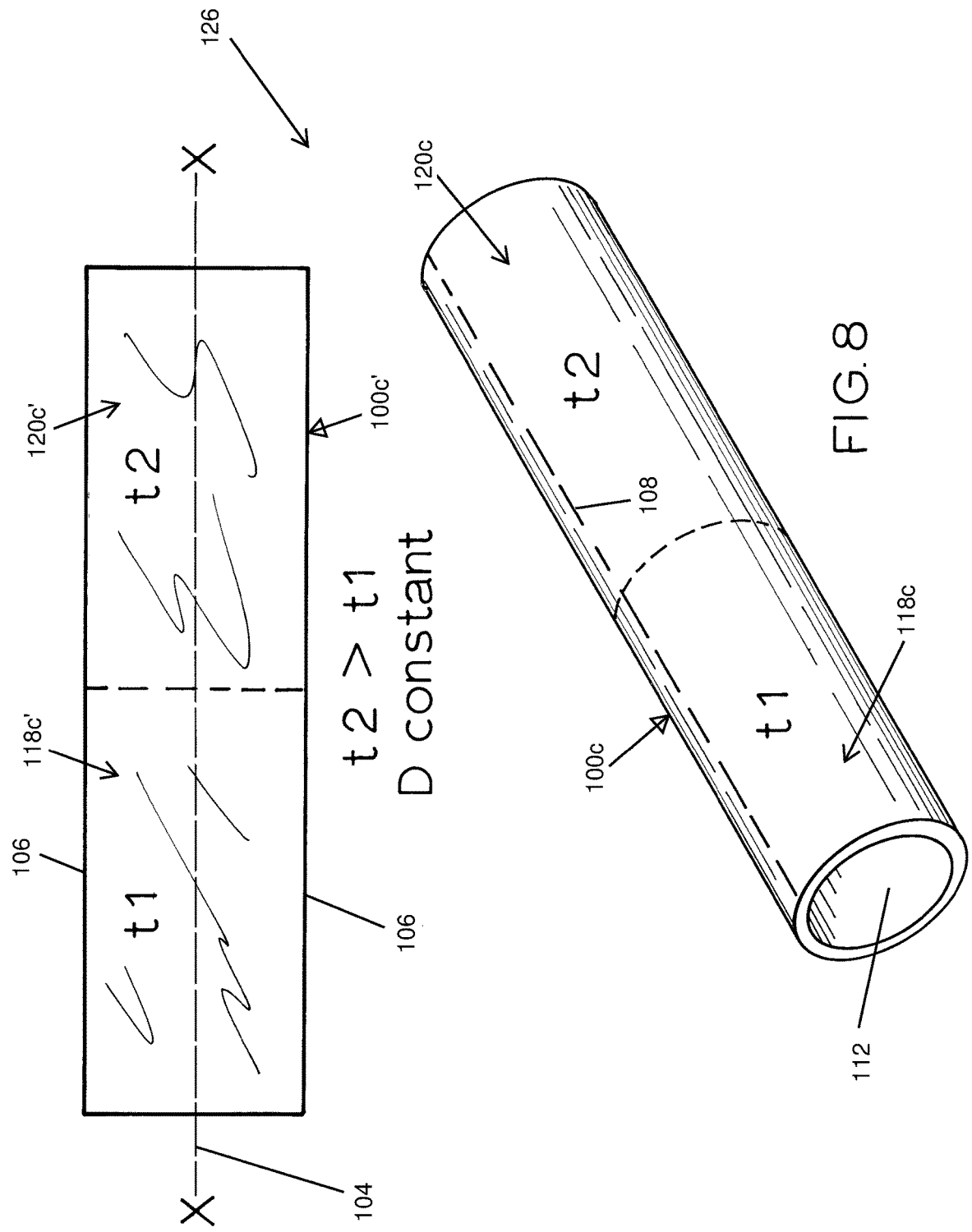
FIG. 8 illustrates a blank and an inflatable tubular portion formed therefrom, the blank and tubular portion including a first and second zone of different thickness according to an embodiment of the present invention.
Figure 9:
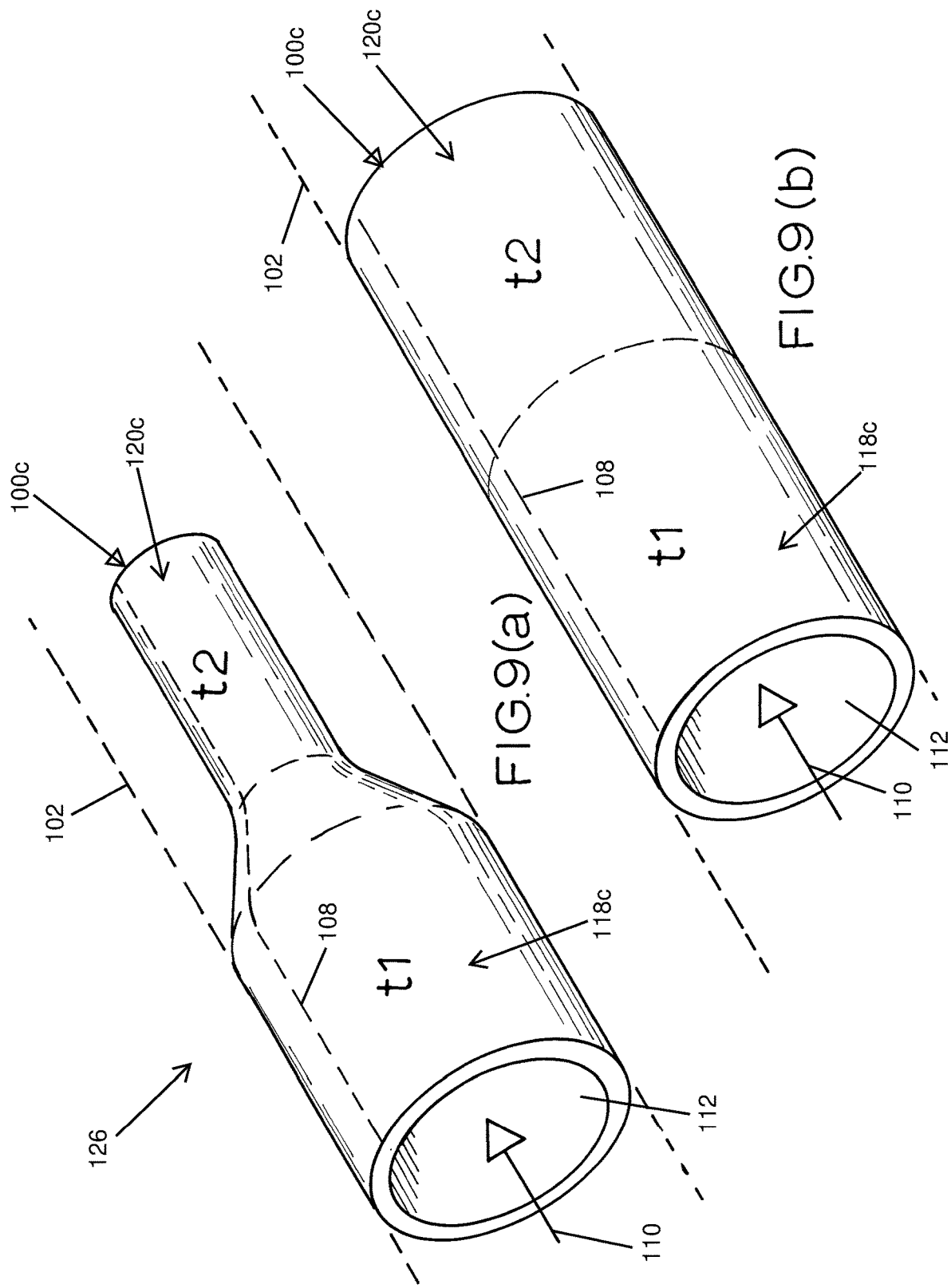
FIGS. 9a-9b illustrate in perspective view the sequential inflation of the tubular portion of FIG. 8.

FIG. 8 shows a further example 126, namely, sleeve 100c in which the second zone 120c' of the sleeve blank 100c' has a greater thickness t2 than the thickness t1 associated with the first zone 118c'. These zones are dimensioned such that each of the resulting first 118c and second 120c tubular portions are of substantially equal diameter D and each zone is also made of the same or a similar rubber compound. As shown in FIG. 8(a), the first tubular portion 118c will inflate first until it presses against the internal wall 116 of the vessel 102, followed by the second tubular portion 120c which also then presses against the internal wall 116 of the vessel 102 as shown in FIG. 8(b).

It will be appreciated that by manufacturing an inflatable sleeve 100 in the manner described above, one may vary the diameter and/or thickness and/or rubber compound used in the sleeve's manufacture at any part of the product.

Different sleeve zones can be formed using a single blank of material, as described above. Alternatively, two or more different zones can be formed separately in two or more blanks and subsequently joined to form a single blank (e.g. by a vulcanisation process).

Achieving different thicknesses can also be achieved using one of several methods. For example, two different zones of a single sleeve could achieve a different thickness t by overlapping two separate blanks of material in the zone that is to be of greater thickness. For example, if a first zone is to be 6 mm thick, and a second zone is to be 9 mm thick, a single blank of 6 mm thickness could be used for both zones, with an appropriately dimensioned 3 mm thick blank used to overlap over the second zone only. When joined to the second zone, creating a total thickness of 9 mm is created in the second zone as compared with a 6 mm thickness in the first zone.

The sleeves 100 need not be limited to tubular portions which extend along a single axis. In this regard, multiple sleeves may be constructed and then joined to form, for example, 45 degree wyes or 90 degree tees. For a 90 degree tee, for example, two sleeve blanks may be constructed to form two tubular portions, and then the two tubular portions may be joined at 90 degrees. One method of achieving this is by first forming an appropriately sized aperture intermediate the ends of one tubular portion (e.g. formed in a blank prior to folding and joining the blank to form the tubular portion), and then joining an end of the second tubular portion to the first tubular portion along the circumference of the aperture in the first tubular portion. If the material used is a rubber compound, then a vulcanisation process could be used to join the two tubular portions in order to form the tee, although other materials and other joining processes could equally be used.

Figure 10:
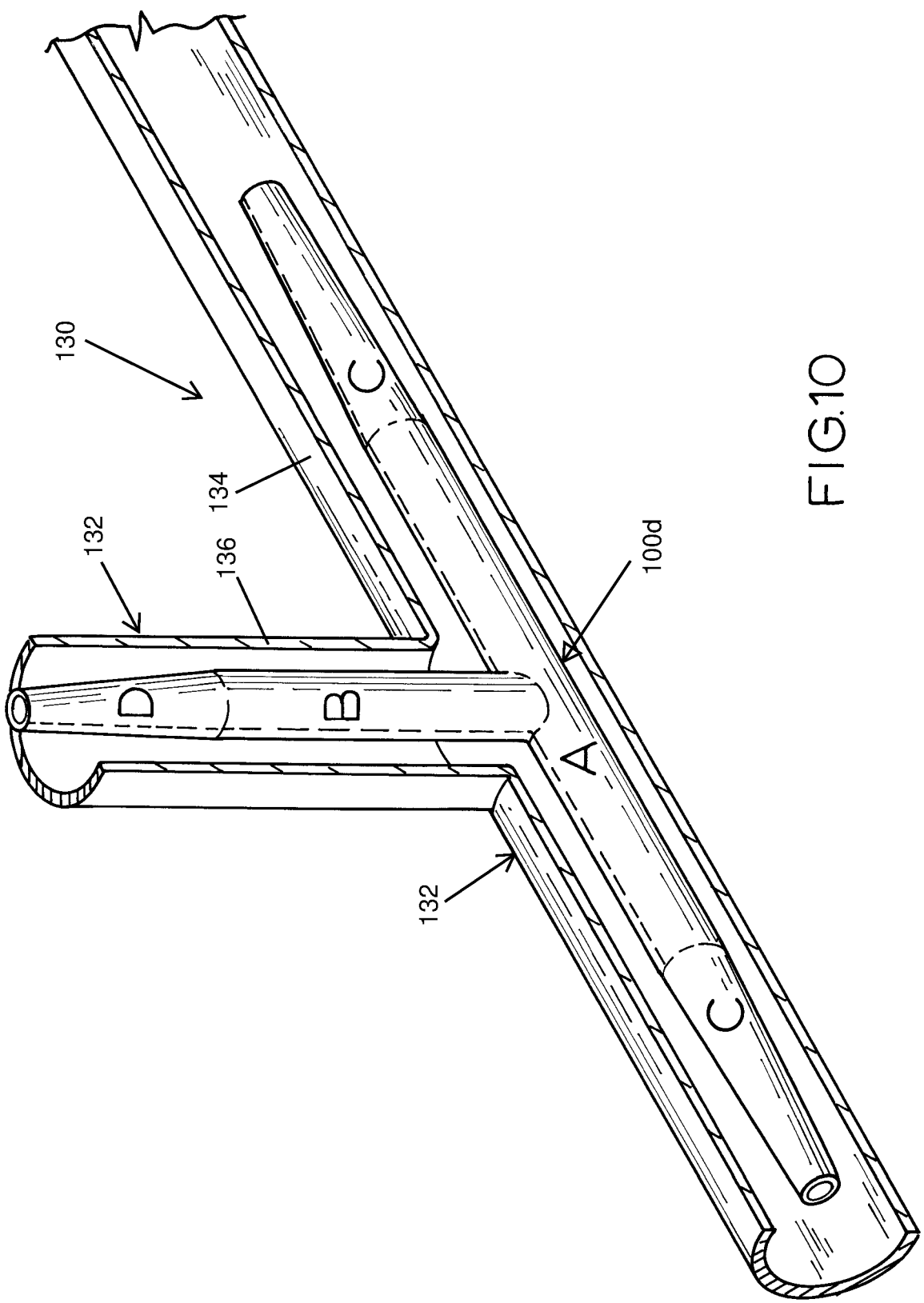
FIG. 10 illustrates a perspective view of an inflatable sleeve for use with a packer assembly, the inflatable sleeve including five zones according to an embodiment of the present invention, wherein two or more of the zones are of different thickness and/or diameter and/or rubber compound.

The inflatable sleeves described herein may be used in any application in which it may be useful to manage the inflation of a sleeve inside a constrained vessel. One such application is the repair of sewer pipe junctions in which an inflatable sleeve is required to be inflated by an apparatus for installing a resin-impregnated liner in the junction for repairing the junction. FIG. 10 illustrates an example 130 of an inflatable sleeve 100d that may be associated with such an apparatus (the apparatus itself not shown), the sleeve 100d configured to sit inside the junction of a 90 degree tee. In the embodiment shown, the 90 degree tee is a 90 degree tee junction 132 between a main pipe 134 and a lateral pipe 136. In this embodiment, the sleeve 100d is made up of five zones including a main tubular zone A located centrally in main pipe 134, a lateral tubular zone B that is joined to the main tubular zone A at a 90 degree angle and extends into the lateral pipe 136, two end zones C associated with the main tubular zone A, and an end zone D associated with the lateral tubular zone B. Each of the end zones C and D are tapered, similar to the tapered first tubular zone 118b of sleeve 100b shown in example 124 of FIG. 7.

Figure 11:
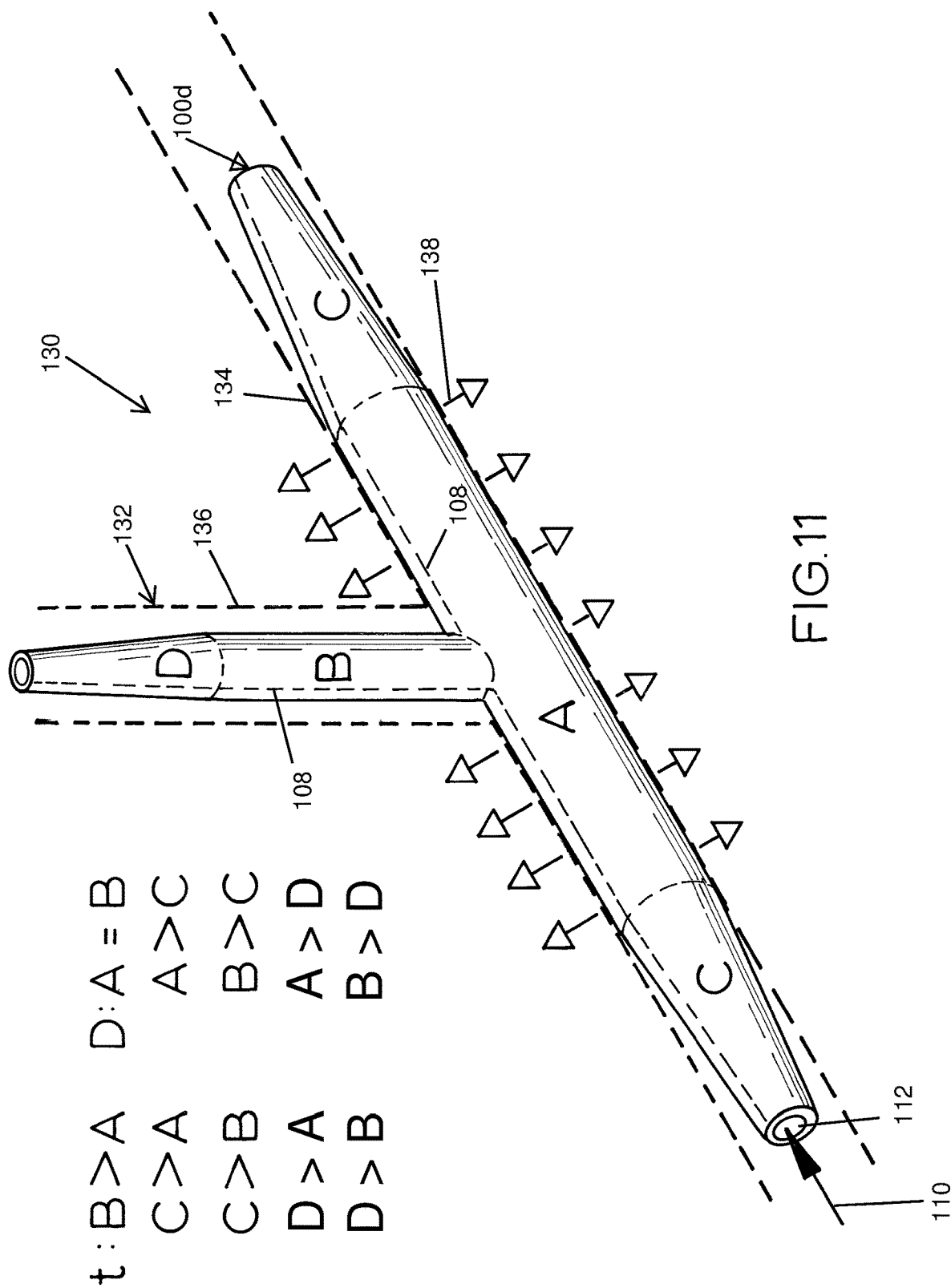
FIGS. 11-12 illustrate in perspective view the sequential inflation of the inflatable sleeve of FIG. 10.
Figure 12:
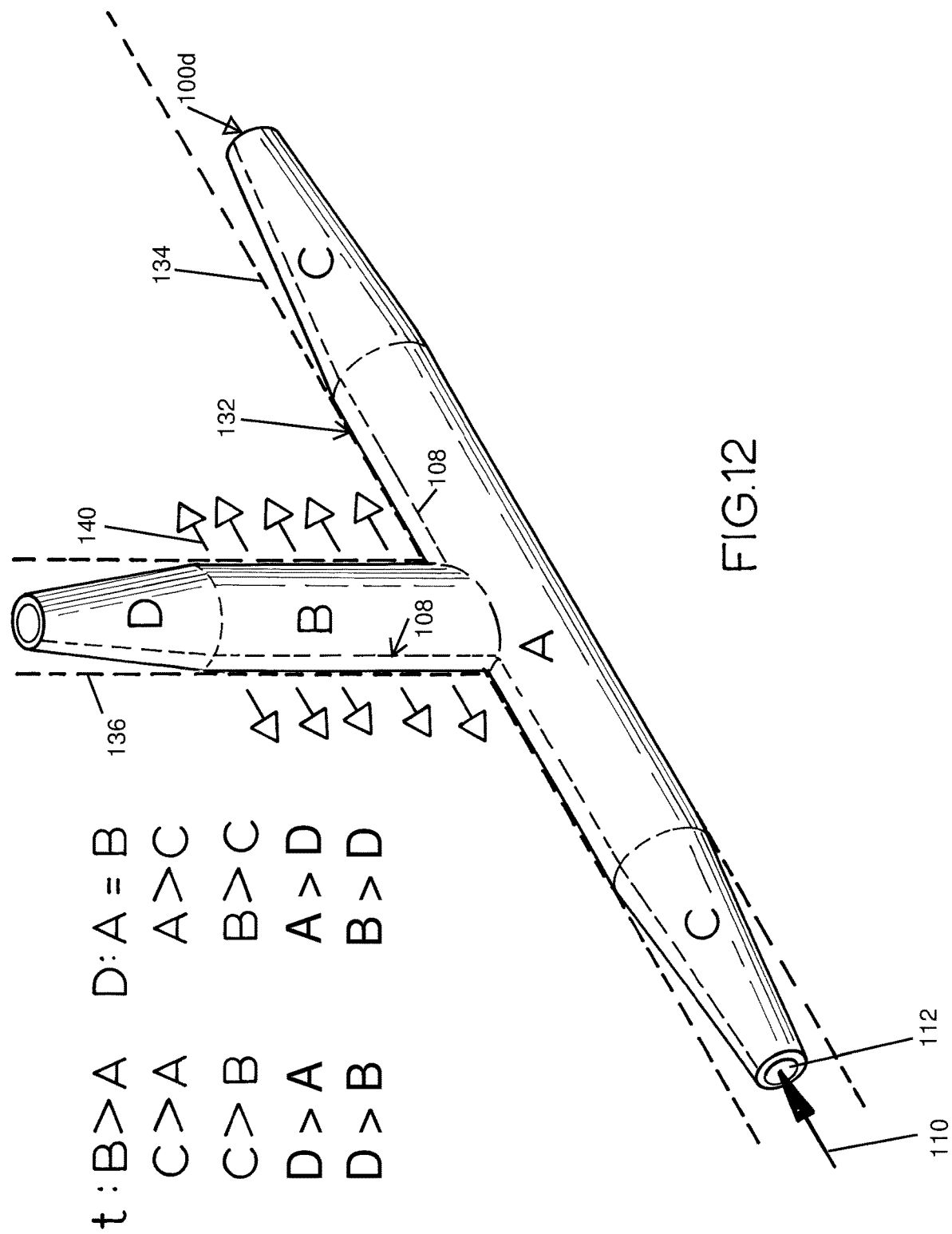

FIGS. 11-12 then show the sequential inflation of the sleeve 100d of example 130 according to a particular embodiment. In this embodiment, the diameter D of tubular zones A and B is greater than the diameter of the end zones C and D, the thickness t of tubular zone B is greater than the thickness of the tubular zone A, and the thickness of the end zones C and D is greater than the thickness of zones A and B. Further, the material used to manufacture each zone is the same or a similar rubber compound.

It can be appreciated that in this scenario, when gas 110 is introduced into the sleeve cavity 112, the central tubular zone A inflates in a radial direction 138 first until it presses against the internal wall of the main pipe 134 of the junction 132, followed by inflation of the lateral tubular zone B in a radial direction 140 which causes the tubular zone B to press against the internal wall of the lateral pipe 136. At this point, zones C and D are yet to inflate.

The tapered configuration of the end zones C and the fact that they are yet to inflate means that any camera located at an end of the packer assembly and configured to provide the operator with a view of the inflation sequence will not be obstructed and will allow the operator to view the main zone of liner being pressed against the wall of the main pipe. It is at this point, once the operator is satisfied that the liner is locked in place in the correct position, that the air pressure may be increased to provide an additional force and promote adhesion of the liner to the wall. When further air is supplied, the end zones C and D may then inflate, although this is not shown in FIG. 11 or 12. For reasons described above, it may be beneficial for the end zones C and D to remain uninflated or only minimally inflate.

Accordingly, the central part A of the main packer will inflate first and lock the packer in place. Next, the lateral part B would inflate and finally, although not necessarily required for reasons described above, the rubber at the end elements C and D may remain uninflated or only minimally inflate. In a further embodiment (not shown), the sleeve may include additional end zones, i.e. one end zone at each of the distal free ends of zones C and D, to provide additional surface area for clamping of the sleeve ends to the packer assembly.

It should now be appreciated that the inflation attributes (including pressures and sequence of inflation) are a function of dimension (e.g. rubber thickness t and diameter D), and/or physical properties (e.g. selection of rubber compound material), associated with each respective zone. One may characterise this relationship as pressure being proportional to elastic modulus*thickness/diameter, such that as the diameter of one zone increases, the thickness of the zone needs to increase proportionally to ensure that the pressure required to inflate the zone remains the same. Similarly, if the thickness and diameter remain constant but the modulus of elasticity of the zone doubles, for example, the pressure required to inflate the zone will need to be doubled.

The skilled addressee would realise the benefits of the embodiments of the present invention. When using the inflatable sleeve 100d in a pipe liner installation application, for example, sealing sleeves may be constructed from flat blanks of rubber compound and joined in such a way to achieve desired size, shape, inflation and pressure outcomes. Furthermore, during inflation, the sleeve may be made to inflate such that only the zone(s) of the packer with the liner attached increases in diameter in the first instance, and the zone(s) of the packer between the liner and the end element remains largely uninflated. In this way, the operator retains vision of the liner material and is able to see it being pressed against the host pipe. Once the liner is in place, the zone(s) of the packer sleeve between the liner and the end elements can be made to inflate or can remain uninflated depending on the operator's preference.

The following paragraphs describe a practical implementation of the present invention according to an embodiment in which there is a 90 degree tee junction 132 similar to that shown in FIGS. 11-12 but having a main pipe diameter of 150 mm and a reduced lateral pipe diameter of 100 mm. In this example, to achieve a desired inflation sequence such as that described above with reference to FIGS. 11-12, a rubber thickness of 6 mm could be used in the central tubular zone A, 6 mm in lateral tubular zone B, and 9 mm in the end tubular zones C and D. It will be appreciated that the thickness of zone B is no longer greater than the thickness of zone A (as in the example of FIGS. 11-12). If additional end clamping portions (not shown) are utilised, then these too could have a 6 mm thickness, for example.

In this example, the diameter of zone A is also no longer equal to the diameter of zone B. In particular, the diameter in the central tubular zone A is 80 mm (outer diameter), and the diameter in the lateral tubular zone B is 65 mm (outer diameter). In each tubular zone C, the diameter may reduce lengthwise from 80 mm down to 60 mm (outer diameter) at the free end of each of the end tubular zones C.

The reason for the size of zone D being small is quite different to the reason for zone C being small. Since the objective of zone D is to be as small as possible so that the distal end of the lateral arm can enter into the lateral pipe, zone D will generally have the smaller diameter section. For example, zone D may reduce lengthwise down to an internal diameter of 40 mm whilst maintaining a 9 mm thickness along its length so that the end cap at the end of the lateral arm can be small (the metal end cap being the first part that enters into the lateral pipe).

The pressure required to reach full inflation of portions A and B, in this example, would be approximately 80 kPa (the approximate gas pressure required to make the sleeve in the region of the liner reach the wall), which means that the rubber has only stretched by 50% and the rest of the rubber sleeve, including zones C and D, has hardly inflated at all. The gas pressure may then be increased by an additional 50 kPa, for example, to ensure that the liner material and resin is pressed hard against the host pipe. This force maximises the ability of the liner to adhere strongly to the host pipe. For example, if 80 kPA was needed for a particular region where the liner sits to reach the wall, this process now being viewable using the CCTV camera, then the total pressure applied to the packer would be 130 kPa.

It is to be understood that the pressure required to reach the pipe walls will vary from size to size but one of the objectives might be to design the sleeves using the method described above to ensure that all packers of various sizes and shapes always reach the wall at 80 kPa pressure.

Accordingly, it should now be appreciated that an optimum size, pressure and inflation scenario may be achieved. In the above example, the central zone A of the main inflates first and touches the host pipe wall when a pressure of less than 100 kPa is applied (e.g. 80 kPa according to the above example, where 60 kPa may be supplied to inflate zone A, and lateral zone B made to subsequently inflate when a second pressure approximately 20 kPa higher than the central part of the main is supplied). By making the diameter of zone A approximately 50% of the host pipe diameter (e.g. 80 mm in a pipe of diameter 150 mm), the % elongation is maintained at approximately two which is well beneath the yield point of the rubber. The zones C and D near the end caps inflate last or remain largely uninflated.

The packer has already been positioned very accurately lengthwise using the camera and some other geometric means. The objective is for the main region of the liner associated with zone A to reach the wall first in order to "lock" the packer in place lengthwise. The packer should remain in place lengthwise and not shift by the lateral arm inflating, and this result is achieved by first inflating zone A. Then (shortly afterwards), i.e. by increasing the pressure by approximately 20 Kpa, the lateral arm inflates in zone B in the region of the liner. At this point, the liner is pressed against the wall and is still in the correct position. The camera looking at the packer (e.g. over the main end) can see the liner is pressed against the wall and hasn't moved. The additional 50 kPa may then be added to cause the liner to press against the wall and promote adhesion of the resin. During this final pressing, zone A of the sleeve will obstruct the view of the camera but at this point vision is no longer required. Accordingly, a packer for installing a liner at a pipe junction may now be designed to inflate in exactly the correct sequence, at low pressures and with less than 200% elongation, for example.

If it was not desirable for the zones C and D to inflate at all, then this could be achieved by making the rubber very thick and/or the diameter very small in those zones. Alternatively, the rubber in these zones could be fibre reinforced in order to control the extent to which the zones elongate in any one direction as described earlier. Additionally, if it was desirable to only half inflate the end zones C and D, a suitable rubber thickness and/or diameter and/or rubber compound could be selected to achieve that result.

The configurations of the end zones C and D may also be adjusted to address what is known as the "end effect". The "end effect" occurs in view of the sleeve having a finite length and hence, in practice, in the regions near the ends of the sleeve, the rubber inflates quite differently to the middle. In say a 1 metre length of sleeve having a diameter 60 mm, the 180 mm length adjacent to each end will inflate slower than the bulk. This effect is also relevant and may be used to guide the user when selecting a length, rubber compound, diameter and/or thickness at the end zones in order to control the inflation of the ends C and D. As mentioned above, additional end clamping zones could also be used, which may also serve to prevent or minimise the "end effect".

Throughout this specification and claims which follow, unless the context requires otherwise, the word "comprise", and variations such as "comprises" and "comprising", will be understood to mean the inclusion of a stated feature or step, or group of features or steps, but not the exclusion of any other feature or step, or group of features or steps.

The reference to any prior art in this specification is not, and should not be taken as an acknowledgement, or any suggestion that, the prior art forms part of the common general knowledge.

The invention claimed is:

1. An inflatable sleeve for inflation inside a constrained vessel, the inflatable sleeve including:
   a first zone that when inflated forms a first substantially tubular portion of the sleeve; and
   at least one further zone that when inflated forms at least one further substantially tubular portion of the sleeve that is substantially coaxial with the first tubular portion,
   wherein the first and at least one further zone define an internal cavity of the sleeve into which gas pressure is introduced to inflate the sleeve;
   wherein the first and at least one further zone are made from the same blank of material, or from individual blanks of material, each made of rubber compound capable of elastic elongation in a radial direction during inflation;
   wherein the first and at least one further zone are configured such that the first zone has a different diameter and/or thickness and/or physical property as compared with the at least one further zone, thereby causing the zones to inflate in a predetermined sequence and/or require a different gas pressure to reach an inner wall of the constrained vessel; and
   wherein said different physical property is achieved by causing the different zones to be made of a different rubber compound.

2. An inflatable sleeve according to claim 1, wherein each different rubber compound has a different elastic modulus such that the zone with a greater elastic modulus will experience reduced elongation at any given supply pressure as compared with the other zone(s).

3. An inflatable sleeve according to claim 1, wherein each blank of material is shaped into a substantially tubular form by being folded about a line of symmetry and joined along or adjacent at least two edges thereof into the substantially tubular form using a vulcanisation process.

4. An inflatable sleeve according to claim 3, wherein the sleeve includes at least one zone dimensioned such that when shaped and joined into a substantially tubular form, the resulting tubular portion is tapered and includes an increasing or decreasing lengthwise diameter.

5. An inflatable sleeve according to claim 1, wherein the blank material is a fibre-reinforced rubber compound.

6. An inflatable sleeve according to claim 1, wherein when the first and at least one further zone are dimensioned such that the first zone has a greater thickness than the at least one further zone, and the first and at least one further zones are of substantially equal diameter, the at least one further zone will inflate first followed by the first zone when gas pressure is introduced inside said cavity.

7. An inflatable sleeve according to claim 1, wherein when the first and at least one further zone are dimensioned such that the first zone has a greater diameter than the at least one further zone, and the first and at least one further zones are of substantially equal thickness, the first zone will inflate first followed by the at least one further zone when gas pressure is introduced inside the cavity.

8. An inflatable sleeve according to claim 1, wherein the vessel includes a main pipe and a lateral pipe, and the sleeve includes a main and lateral portion formed by joining an end of the first tubular portion to an intermediate location along a second tubular portion such that the first tubular portion extends along a first axis inside the main pipe and the second tubular portion extends along a second axis inside the lateral pipe, wherein one or both of the main and lateral sleeve portions includes said coaxial first and at least one further zones.

9. An inflatable sleeve according to claim 8, wherein the inflatable sleeve includes five zones that in use form a tubular sleeve having a main and a lateral tubular portion associated with each of the main pipe and lateral pipe respectively.

10. An inflatable sleeve according to claim 9, wherein a first zone of the five zones forms a central part of the main tubular portion, a second zone forms a central part of the lateral tubular portion, a third and fourth zone are located at distal free ends of the first zone and are substantially coaxial therewith, and a fifth zone is located at a distal free end of the second zone and is substantially coaxial therewith.

11. An inflatable sleeve according to claim 10, wherein a thickness of the second zone is greater than a thickness of the first zone, and a thickness of the third, fourth and fifth zones is greater than the thickness of the first and second zones, and a diameter of the tubular portions formed by the first and second zones is substantially equal, said diameter being greater than a diameter of the tubular portions formed by each of the third, fourth and fifth zones, the sleeve thereby operable to cause the first zone to inflate prior to the second zone which will inflate prior to inflation of the third, fourth and fifth zones when gas is introduced inside the cavity.

12. An inflatable sleeve according to claim 11, wherein each of the third and fourth zones are dimensioned such that the resulting tubular portions are tapered and decrease in diameter as they extend away from the tubular portion formed by the first zone, and the fifth zone is dimensioned such that the resulting tubular portion is tapered and decreases in diameter as it extends away from the tubular portion formed by the second zone, the free ends of tubular portions formed by the third, fourth and fifth zones thereby dimensioned to facilitate clamping of the free ends.

13. One or more blanks of material for forming an inflatable sleeve configured in accordance with claim 1.

14. A method of manufacturing an inflatable sleeve configured in accordance with claim 1, the method including shaping one or more of the blanks of rubber compound corresponding with the first or at least one further zone into substantially tubular form by folding each blank of material and causing at least two edges thereof to be drawn together.

15. A method according to claim 14, further including applying a vulcanisation process to cure the rubber compound to thereby achieve one or more of:
  joining of the folded edges of individuals blanks to maintain each blank in said substantially tubular form;
  joining of the ends of blanks positioned adjacent one another to form at least two coaxial zones;
  joining of blanks positioned to form zones extending along a different axis to one another; and
  joining of two or more blanks that have been layered to create a zone of increased thickness.

16. A method of installing a flexible liner into a junction between a main pipe and a branch pipe, the method including the steps of:
  fitting the flexible liner over an installation apparatus, the apparatus including:
    an elongate body;
    a lateral arm including:
      a proximal end connected to the body, and
      a distal end; and
    an inflatable sleeve extending at least partially over the body and the lateral arm, the inflatable sleeve configured in accordance with claim 1;
  inserting the installation apparatus and fitted liner into the main pipe via an access opening;
  pushing or pulling the installation apparatus and fitted liner along the main pipe towards an entrance to the branch pipe;
  further pushing or pulling the installation apparatus and fitted liner along the main pipe so that the lateral arm is driven through the entrance of the branch pipe into the branch pipe;
  inflating the sleeve one or more times so as to press the fitted liner against the inner walls of both the main pipe and the branch pipe until the liner is fixed in place;
  deflating the sleeve; and
  withdrawing the installation apparatus from within the liner fixed within the branch and main pipes.

17. An inflatable sleeve for inflation inside a constrained vessel, the inflatable sleeve including:
  a first zone that when inflated forms a first substantially tubular portion of the sleeve; and
  at least one further zone that when inflated forms at least one further substantially tubular portion of the sleeve,
  wherein the first and at least one further zone include a layer of rubber compound defining an internal cavity of the sleeve into which gas pressure is introduced to inflate the sleeve, the layer of rubber compound capable of elastic elongation in a radial direction during inflation;
  wherein the first and at least one further zone are configured such that the first zone has a different dimension and/or physical property as compared with the at least one further zone, thereby causing the zones to inflate in a predetermined sequence and/or require a different gas pressure to reach an inner wall of the constrained vessel; and
  wherein the zones are formed by at least two blanks of rubber compound shaped into substantially tubular form, where:
  a different dimension is achieved by:
    in a configuration where the at least one further zone is substantially co-axial with the first zone, causing the at least one further zone to have an increased thickness by including a second blank of rubber compound in the particular zone to form a second layer, or
    in a configuration where the at least one further zone extends along an axis that is different to an axis associated with the first zone, forming the at least one further zone using a second blank having a different diameter and/or thickness as compared with the blank used to form the first zone, and
  a different physical property is achieved by:
    forming the at least one further zone using a second blank made of a different rubber compound as compared with the blank used to form the first zone.

18. A pipe liner installation apparatus for installing a flexible liner into an internal connecting region between a main pipe and a target branch pipe, the apparatus deployable from within the main pipe and including:
  an elongate body;
  a lateral arm including a proximal end connected to the body and a distal end, an inflatable sleeve extending at least partially over the body and the lateral arm, the inflatable sleeve including:
    a first tubular portion of the sleeve extending at least partially over the body; and
    a second tubular portion of the sleeve extending at least partially over the lateral arm,
    each tubular portion including a layer of rubber compound defining an internal cavity of the sleeve into which gas pressure is introduced to inflate the sleeve, the layer of rubber compound capable of elastic elongation in a radial direction during inflation;
    each tubular portion including one or more zones configured such that one or more different zones have a different dimension and/or physical property, thereby causing the zones to inflate in a predetermined sequence and/or require a different gas pressure to reach an inner wall of the constrained vessel;
    the different zones formed by at least two blanks of rubber compound shaped into substantially tubular form, where:
    a different dimension is achieved by:
      in a configuration where the different zones are substantially coaxial zones, causing a particular zone to have an increased thickness by including a second blank of rubber compound in the particular zone to form a second layer, or
      in a configuration where the different zones extend along different axes, forming one zone using a first blank of rubber compound having a different diameter and/or thickness as compared with the blank used to form a further zone, and
    a different physical property is achieved by:
      in a configuration where the different zones are substantially co-axial zones, or extend along different axes, forming one zone using a first blank made of a different rubber compound as compared with the blank used to form a further zone.

19. A pipe liner installation apparatus according to claim 18, wherein inflation of the sleeve causes the sleeve to press the flexible liner against inner walls of both the main pipe and the branch pipe until the liner is fixed in place.

20. A pipe liner installation apparatus according to claim 18, wherein said different physical property is achieved by causing the different zones to be made of a different rubber compound, each rubber compound having a different elastic modulus.

* * * * *